United States Patent Office 3,456,900
Patented July 22, 1969

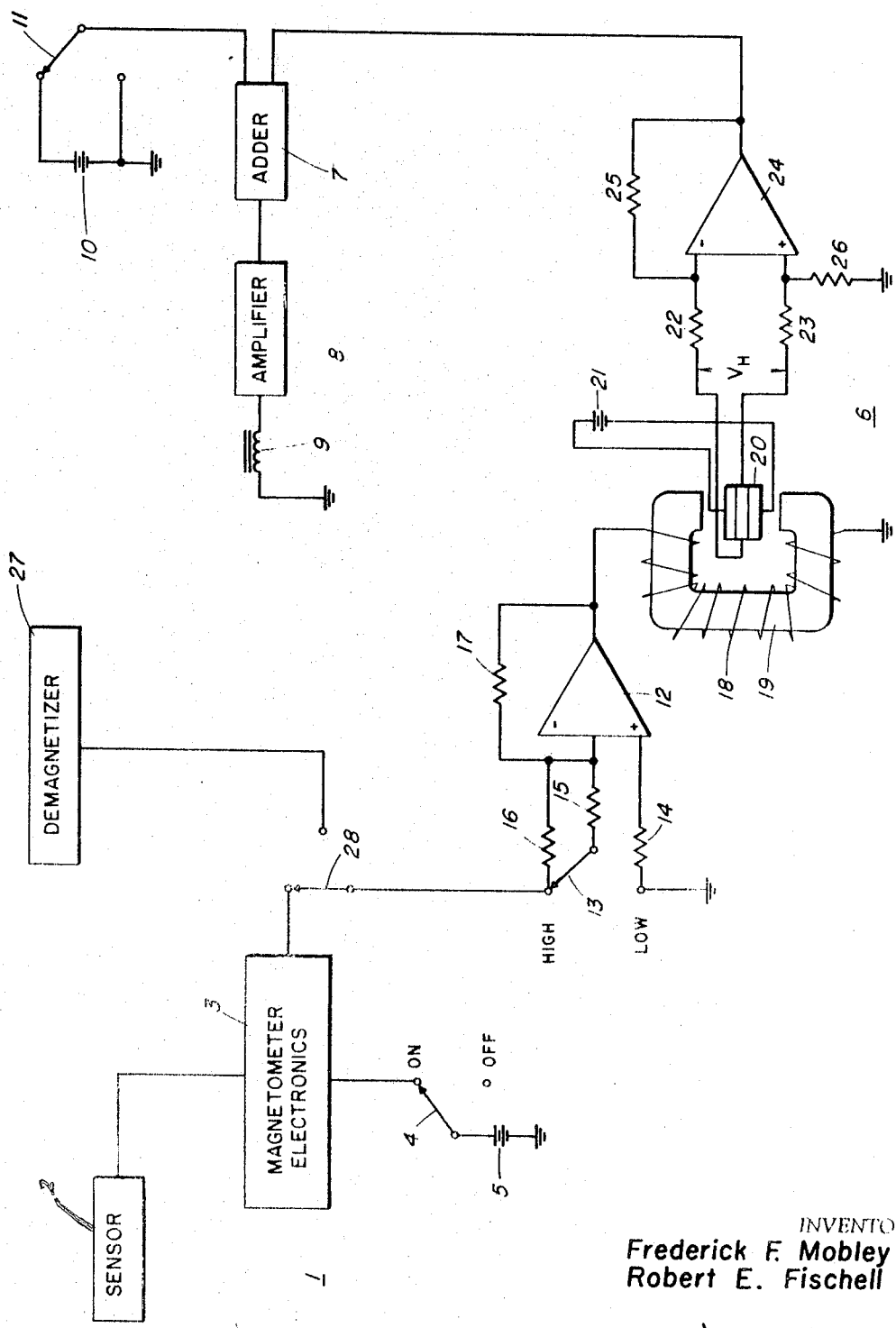

3,456,900
ENHANCED MAGNETIC DAMPING SYSTEM
Frederick F. Mobley and Robert E. Fischell, Silver Spring, Md., assignors, by mesne assignments, to the United States of America as represented by the Secretary of the Navy
Filed Aug. 14, 1967, Ser. No. 660,844
Int. Cl. B64g 1/20; G01r 33/02
U.S. Cl. 244—1                        7 Claims

ABSTRACT OF THE DISCLOSURE

A space vehicle damping system having a magnetometer which produces a signal proportional to a component of an external magnetic field, which signal is delayed in phase by a hysteresis generator, amplified, and drives an electromagnet. The magnetic dipole moment generated by the electromagnet reacts with the external field to produce a stabilizing torque on the space vehicle.

Background of the invention

The invention relates generally to space vehicle stabilizers and more particularly to magnetic apparatus for damping satellite attitude motion.

Prior art satellite stabilization schemes include the use of pivoted booms extended from the satellite and passive magnetic hysteresis rods within the satellite. Pivoted boom damping involves the use of weighted arms extended from the satellite and is effective for damping librations of the satellite when it is to be gravity stabilized. While gross attitude motion can be damped by this method, the satellite tends to oscillate and further damping by some additional means is often required.

Passive magnetic hysteresis rods have been used to further damp gravity librations. The rods are formed of soft magnetic material which tends to be magnetized by the earth's magnetic field. As the satellite's attitude changes with time the hysteresis rods form an angle with the relatively stationary external magnetic field and a torque is produced due to the interaction of the fields which tends to stabilize the satellite. In addition to damping of gravity librations, hysteresis rods also have been used to provide despin and detumble of the satellite after injection into orbit and to damp magnetic oscillations. A significant drawback of the passive rod system is the requirement of a relatively strong external magnetic field thus making the apparatus inoperative at high altitudes such as those encountered in synchronous-orbiting satellites where the earth's magnetic field is typically 200 to 400 times weaker than at lower orbits.

Summary of the invention

Accordingly, one object of this invention is to provide an improved space vehicle stabilization apparatus.

Another object of this invention is to provide an improved magnetic damping apparatus for a space vehicle.

Still another object is to provide magnetic damping apparatus responsive to weak magnetic fields.

Yet still another object is to provide magnetic damping apparatus for a satellite orbiting at high altitudes.

A further object is to provide an active magnetic damping apparatus for space vehicles.

Briefly, in accordance with one embodiment of the invention, these and other objects are attained by providing in a magnetic damping system the combination of a magnetometer, a hysteresis generator, an amplifier and an electromagnet. Three such systems may be included if damping along three axes is desired. The magnetometer reads the magnetic field intensity along one of the satellite's axes and produces an electrical signal proportional to that component of magnetic field. The signal is then processed in the hysteresis generator which essentially creates a phase delay and the generator output is amplified and fed into the linear electromagnet oriented in the same axis as the sensor to produce a magnetic dipole moment that lags behind the ambient external magnetic filed direction thus causing the satellite to lose angular momentum about that axis.

Brief description of the drawing

A more complete appreciation of the invention and many of the attendant advantages will be readily appreciated as the same becomes better understood by reference to the following detailed description when considered in conncetion with the accompanying drawing wherein the solitary figure is a schematic diagram, partially in block form of one axis of the enhanced magnetic damping system.

Description of the preferred embodiments

The figure shows an embodiment of the enhanced magnetic damping system disposed in a satellite as including a conventional magnetometer 1 having a conventional magnetic field sensor 2 and an associated electronics package 3. A circuit selector such as a switch 4 provides for supplying electrical power to the magnetometer from a conventional D.C. power source 5. Sensor 2 which is chosen to have directional characteristics reads a component of the earth's magnetic field intensity and a signal proportional to that field is provided at the magnetometer output which is fed to a hysteresis generator 6.

The hysteresis generator produces an output signal voltage which is related to its input voltage as flux density B is related to magnetizing force H in a toroid of magnetic material. The generator is described in greater detail hereinafter. The output signal passes through a conventional adder to a conventional amplifier 8 which drives a conventional linear electromagnet 9. Amplifier 8 is a power amplifier chosen to provide an output current proportonal to the input voltage. Current limiting may be provided to prevent saturation of the electromagnet. The electromagnet produces a magnetic dipole moment $\vec{M}$ which reacts with the external magnetic field H to produce a torque $\vec{T}$ ($\vec{T}=\vec{M}\times\vec{H}$, invector notation) for damping satellite motion. As an optional feature, power to the magnetometer 1 can be turned off and a DC bias level can be applied to the adder 7 by a conventional DC source 10 which is connected by a circuit selector such as switch 11. By this technique a fixed dipole moment can be generated to provide satellite orientation along a particular axis.

Hysteresis generator 6 includes a preamplifier having a circuit selector such as switch 13 to provide high or low gain selection. Resistors 14, 15 and 16 are switched to vary the preamplifier gain. Resistor 17 provides the standard operational ampifier feedback for linear operation. The preamplifier output drives a coil 18 wound on toroidal core 19. Core 19 is formed of a highly hysteretic material and is provided with a gap in which a Hall effect element 20 is placed. When energized from a DC voltage supply 21, the Hall element detects flux density in the toroidal core and produces a voltage $V_H$ proportional to that field. Voltage $V_H$ is fed through resistors 22 and 23 to a differential amplifier 24. Resistor 25 provides feedback for linear operation and resistor 26 provides gain adjustment. Residual hysteresis in the generator can be erased by applying a sine wave of slowly decaying amplitude from a conventional demagnitizer 27 through a circuit selector, such as switch 28, to the generator input.

The damping system described has been found to be effective for removing spin and tumble of a satellite immediately after injection into orbit. It is also useful for damping oscillations when the satellite is magnetically stabilized and for damping gravity librations. The system has been found to function effectively in a satellite in synchronous orbit about 18,000 miles above the earth where very weak magnetic fields are encountered. The active nature of the system permits operation in such weak fields where prior art magnetic damping systems are inadequate. In addition, the damping system may be used in combination with other types of damping systems in the space vehicle.

Obviously, numerous modifications and variations of the present invention are possible in light of the above teachings.

What is claimed and desired to be secured by Letters Patent of the United States is:

1. A magnetic damping system comprising the combination of:
    means for sensing a magnetic field and for producing a first signal voltage proportional to said field,
    means for processing said first signal voltage to provide a second signal voltage related to said first signal voltage as flux density B is related to magnetizing force H in a magnetic material,
    means for producing a magnetic dipole moment when energized, and
    means for selectively energizing said last recited means with a signal current proportional to said second signal voltage whereby a magnetic dipole moment is generated to react with said magnetic field to produce a torque.

2. The invention as defined by claim 1 further characterized in that said magnetic field sensing means includes a magnetometer pickup having directional characteristics.

3. The invention as defined by claim 1 further characterized in that said selectively energizing means includes a toroidal-shaped highly hysteretic core having an air gap, a coil wound on said core, and a Hall-type pickup device in said air-gap.

4. The invention as defined by claim 1 further characterized in that said selectively energizing means includes a power amplifier.

5. The invention as defined by claim 3 further characterized by means to apply a damped sine wave voltage signal to said coil whereby said core is demagnetized.

6. The invention as defined by claim 1 further characterized by means for selectively energizing said magnetic dipole moment producing means with a DC signal voltage whereby a fixed magnetic moment is generated.

7. In a space vehicle a magnetic damping system comprising the combination of:
    magnetometer sensor means for detecting a magnetic field component in a predetermined direction,
    magnetometer electronics means connected to said magnetometer sensor means for providing a voltage signal proportional to said magnetic field component,
    a highly hysteretic toroidal-core having an air gap,
    a coil wound on said core,
    means for feeding said voltage signal to said core winding for generating a magnetic field in said air gap,
    a Hall-effect device in said air gap for producing a signal voltage in response to said magnetic field,
    a power amplifier for receiving said last named signal voltage and for providing a signal current proportional to said signal voltage, and
    inductive means for receiving said signal current whereby a further magnetic field is produced which interacts with said first-named magnetic field to produce a damping torque.

References Cited

UNITED STATES PATENTS

| | | | |
|---|---|---|---|
| 3,061,239 | 10/1962 | Rusk | 244—1 |
| 3,228,628 | 1/1966 | Chubb | 244—1 |
| 3,232,561 | 2/1966 | Adams | 244—1 |
| 3,365,643 | 1/1968 | Arce et al. | 318—489 |

FERGUS S. MIDDLETON, Primary Examiner

U.S. Cl. X.R.

244—77; 307—125; 318—18; 324—43